Oct. 25, 1949.  J. E. ECKLUND  2,485,869
TRAILER WITH TILTABLE BODY
Filed Jan. 19, 1948  3 Sheets-Sheet 1

INVENTOR
JOSEPH E. ECKLUND
BY Paul, Paul & Moore
ATTORNEYS

Oct. 25, 1949.　　　　J. E. ECKLUND　　　　2,485,869
TRAILER WITH TILTABLE BODY
Filed Jan. 19, 1948　　　　　　　　　　　3 Sheets-Sheet 2
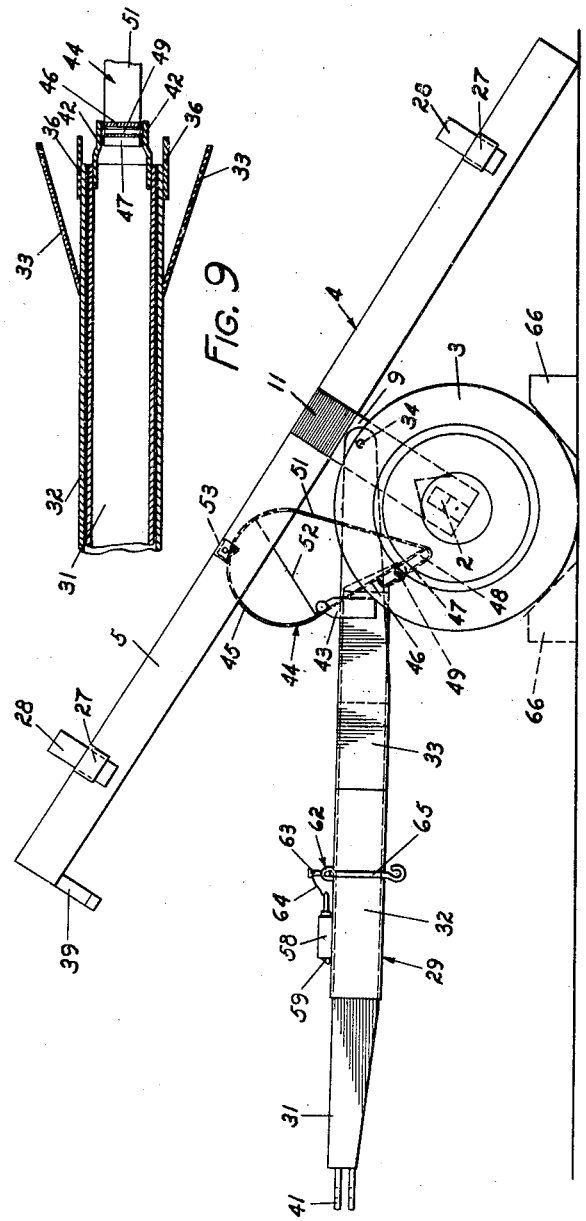
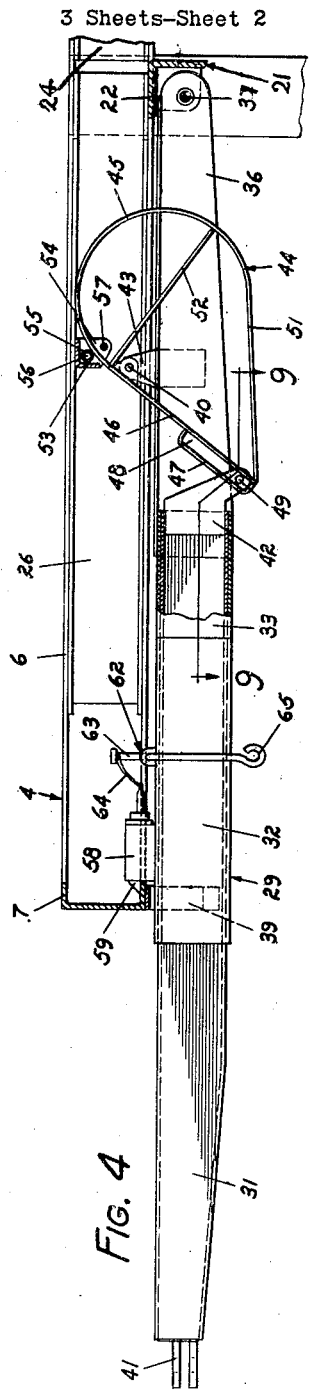
INVENTOR
JOSEPH E. ECKLUND
BY Paul, Paul & Moore
ATTORNEYS Oct. 25, 1949.    J. E. ECKLUND    2,485,869
TRAILER WITH TILTABLE BODY
Filed Jan. 19, 1948    3 Sheets-Sheet 3
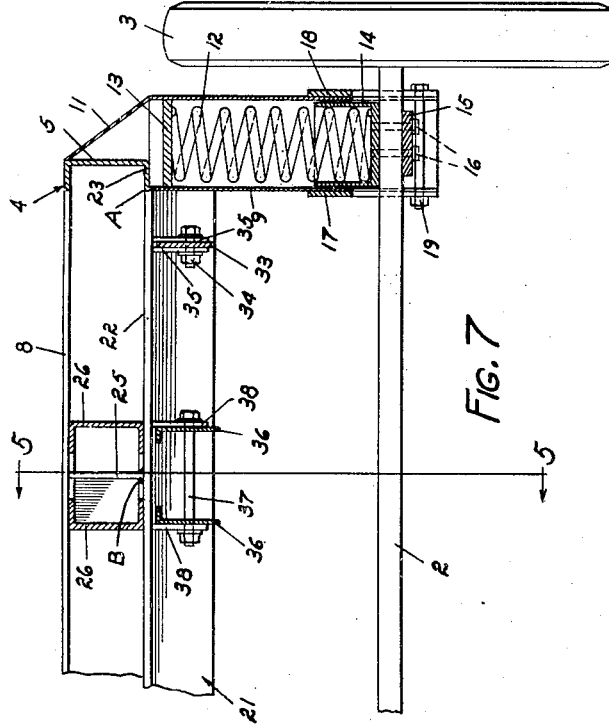
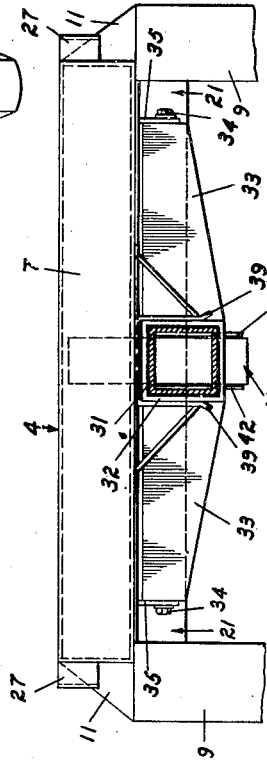
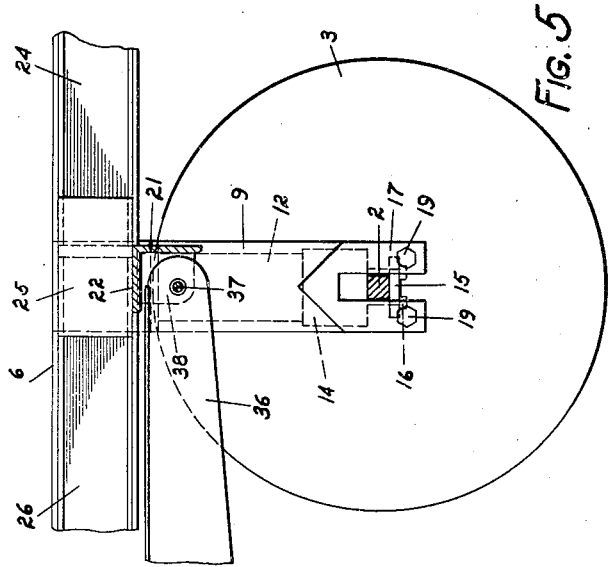
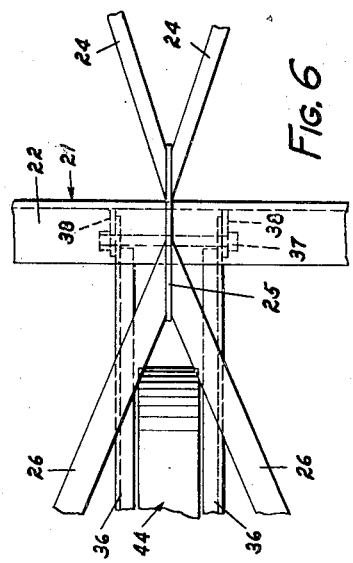
INVENTOR
JOSEPH E. ECKLUND
BY Paul, Paul & Moore
ATTORNEYS Patented Oct. 25, 1949

2,485,869

UNITED STATES PATENT OFFICE 2,485,869

TRAILER WITH TILTABLE BODY

Joseph E. Ecklund, Minneapolis, Minn., assignor of one-fourth to Paul Ebling, Minneapolis, Minn.

Application January 19, 1948, Serial No. 3,009

9 Claims. (Cl. 298—5)

1

This invention relates to new and useful improvements in trailers and more particularly to trailers of the type in which the body is mounted for tilting movement to facilitate dumping its load.

An important object of the present invention resides in the provision of a trailer comprising a tiltable body having means whereby the tilting movement of said body is controlled entirely by relative forward and rearward movements of the towing vehicle with respect to the trailer wheels.

A further object is to provide a dumping type trailer comprising an axle provided with suitable carrying wheels and having a body or load supporting frame mounted thereon adapted for tilting movement to discharge the trailer load, and a tongue having its rear end operatively connected to said frame and its front end having means for coupling it to a towing vehicle, said tongue comprising telescoping members connected together for limited relative axial movement, and means being interconnected with the tongue and the trailer frame whereby when the tongue is shortened by relative rearward movement of the towing vehicle with respect to the trailer, as when the trailer wheels are locked against rearward movement, the trailer frame will tilt to a load-dumping position, and when the tongue is elongated by relative forward movement of the towing vehicle with the trailer wheels when said wheels are momentarily locked against forward rolling movement, the trailer body will automatically be returned to its horizontal load receiving position.

A further object of the invention is to provide a trailer comprising an axle having suitable carrying wheels, and a body supporting frame being mounted for tilting movement on said axle and operatively connected to a tongue comprising a sleeve member fixed to the trailer frame, and a tow bar having its rear end portion telescopically received in said sleeve and having means at its forward end for coupling it to a towing vehicle, and a cam lever being pivoted to the rear end portion of said sleeve and engaged with the rear end of the towing bar whereby when the tow bar is longitudinally moved in a rearward direction within said sleeve, and the trailer wheels are locked against rearward rolling movement, said cam lever is actuated to tilt the trailer frame to a load-dumping position, and the connection between the cam lever and the trailer frame being such that when the tow bar is moved forwardly relative to the sleeve, and the trailer wheels are locked against forward rolling movement, the

2 cam lever will return the trailer frame to its normal horizontal load receiving position.

A further object resides in the novel construction of the cam lever interconnected between the tongue and the trailer frame in such a manner that its operation may be automatically controlled by relative forward or reverse movement of the towing vehicle with respect to the trailer wheels.

A further object of the invention resides in the unique construction of the spring mounting of the trailer body upon its supporting axle.

Other objects of the invention reside in the unique manner of mounting the body supporting frame upon its supporting axle whereby the axle acts as a pivot about which the trailer body supporting frame pivots when dumping a load; in the positive connection provided between the rear portion of the tongue and the trailer frame by means of the cam lever; in the provision of a dump trailer of the class described having means for locking the trailer frame against tilting movement when in horizontal load receiving position; and in the simple and inexpensive construction of the apparatus whereby it may be manufactured in quantity production at low cost.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 3 is a view similar to Figure 1, but showing the trailer body in dumping position;

Figure 4 is an enlarged detail sectional view on the line 4—4 of Figure 2;

Figure 5 is a fragmentary sectional view on the line 5——5 of Figure 7 showing the pivotal connection between the rear portion of the tongue and the trailer frame;

Figure 6 is a plan view of Figure 5;

Figure 7 is a detail sectional view on the line 7—7 of Figure 2;

Figure 8 is a cross sectional view on the line 8—8 of Figure 1, showing the means provided at the forward end of the trailer frame for aligning the trailer frame with the tongue or tow bar supporting sleeve; and Figure 9 is a sectional plan view on the line 9—9 of Figure 4, showing the pivotal connection between the rear end of the tow bar and the cam lever.

Figure 2:
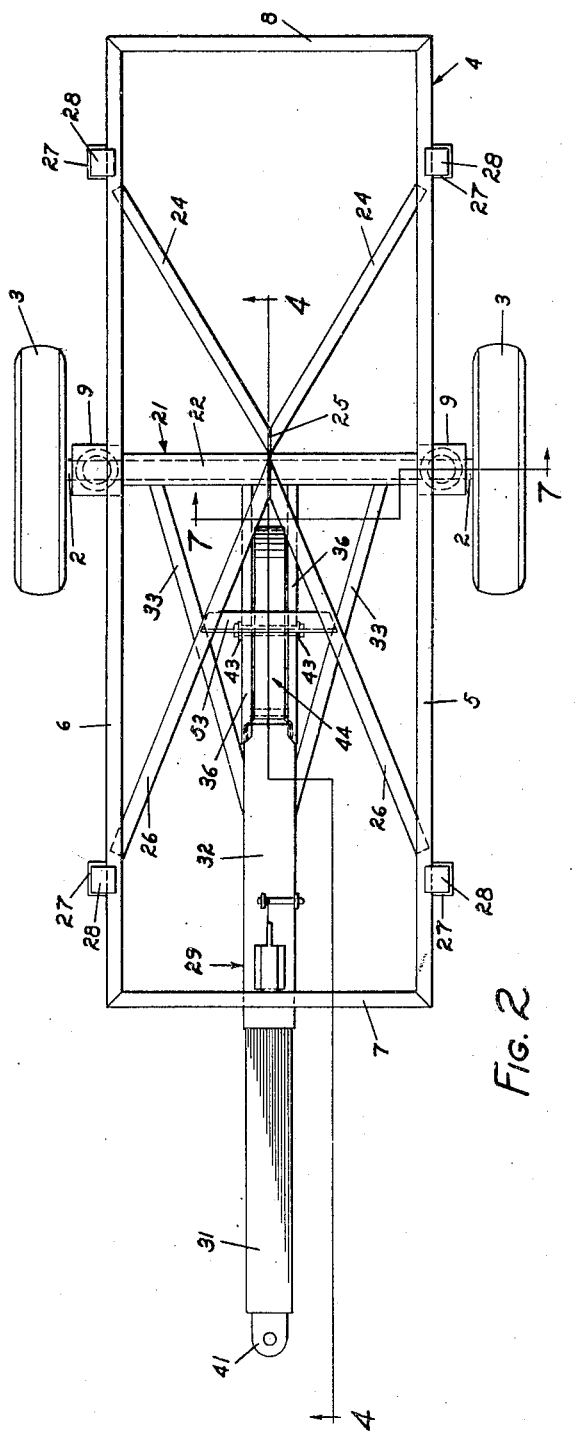
Figure 2 is a plan view of Figure 1.

The novel trailer herein disclosed is shown comprising an axle 2 having suitable carrying wheels 3 rotatably mounted thereon in any well known manner. The frame 4 of the trailer is shown comprising side rails 5 and 6, a front rail 7 and a rear rail 8, all of which may be suitably secured together at the corners of the frame by such means as welding and suitable gusset plates, if necessary.

An important feature of the present invention resides in the construction of the novel spring suspension provided for resiliently supporting the trailer frame 4 upon the axle 2. As shown in Figures 5 and 7, suitable box-like spring housings 9 have their upper ends suitably secured to the side rails 5 and 6 of the frame 4 by such means as welding, suitable inclined plates 11 closing the upper ends of the housings 9 and strengthening their connections with the side frame members 5 and 6, as clearly illustrated in Figure 7. The housings 9 thus become, in effect, an integral or component part of the trailer frame 4.

Mounted within each housing 9 is a load carrying spring 12. As the spring mountings at each end of the axle are alike in construction but one will be described in detail. As best illustrated in Figure 7, the upper end of the spring 12 is seated against a plate 13 fixed within the housing 9 by such means as welding. The lower end of the spring is received in a cup shaped retainer 14 which is seated upon the axle 2 and is securely fixed thereto by a clamping plate 15 having suitable clamping bolts 16 received in threaded engagement with the bottom wall of the retaining member 14, as indicated in dotted lines in Figure 7.

The side walls of the housing 9 are upwardly slotted from their lower ends to receive the axle 2 and to provide the necessary up and down movement for the axle within the lower portion of the housing as a result of flexing of the springs 12 under varying loads. Suitable reinforcing plates 17 and 18 are welded or otherwise secured to the side walls of the housing at its lower end and have slots therein registering with the slots in their respective side walls of the housing 9, as will be understood by reference to Figures 5 and 7. Suitable bolts 19 are provided at the lower end of the housing beneath the clamping plate 15 to provide a stop for limiting the downward movement of the axle within the housing.

The spring suspension above described provides a very substantial support for the trailer frame 4 upon the axle 2, and allows the springs 12 to freely flex under a load whereby the springs will absorb vibration and shocks, as will be understood.

Interposed between the upper ends of the spring housings 9 is a cross member 21, preferably angle iron cross section, as best illustrated in Figure 5. The ends of the cross member 21 abuttingly engage the inner side walls of the spring housing 9 and are welded thereto with its upper face 22 substantially flush with the upper faces 23 of the lower flanges of the side members 5 and 6 of the trailer frame 4, as illustrated at A in Figure 7.

Diagonal braces 24 have their rear ends received between the upper and lower horizontal flanges of the side rails 5 and 6 and are secured to said side rails by such means as welding. The forward ends of the braces 24 are welded to a plate 25 which in turn may be welded to the upper face of the cross member 21, as indicated at B in Figure 7. A pair of diagonal braces 26 are also provided in the forward end portion of the trailer frame and have their rear ends welded to the plate 25 and their forward ends to the side rails 5 and 6 of the trailer frame in a manner similar to the rear diagonal braces 24. Socket members 27 are shown provided on the side members 5 and 6 to receive suitable stakes 28 for retaining a load or load-carrying body on the trailer frame 4.

Figure 1:
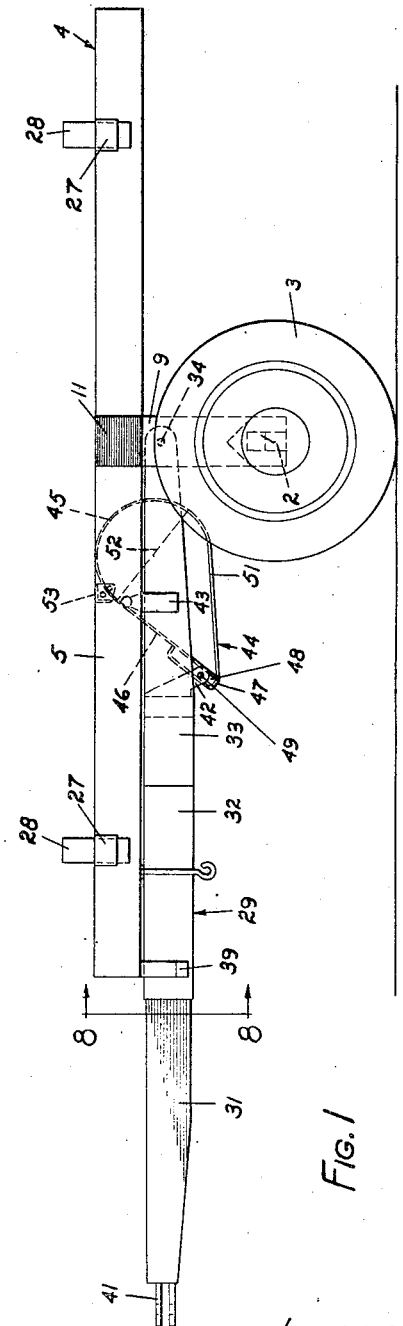
Figure 1 is a side elevation of my improved trailer showing the body in horizontal load receiving position.

Another important feature of the invention resides in the means provided for tilting the load-carrying frame 4 from its normal horizontal position, shown in Figure 1, to the load dumping position shown in Figure 3. Such action of the trailer frame is controlled by limited rearward movement of the towing vehicle with respect to the trailer wheels.

To effect the above described action, a tongue, generally designated by the numeral 29, is shown comprising telescoping members 31 and 32, the former hereinafter being referred to as the tow bar, and the latter as a sleeve.

The sleeve 32 has secured to its rear end a pair of rearwardly extending arms 33 having their rear ends pivotally connected to the cross member 21 by suitable pivot bolts 34 carried by spaced plates 35 welded to the angle iron cross member 21, as will be understood.

The sleeve 32 also has a pair of spaced parallel members 36 secured to its rear end by such means as welding. These members extend rearwardly from the sleeve and have their rearmost ends pivotally connected to the cross member 21 by a pivot bolt 37, disposed in axial alignment with the pivot bolts 34 of the diagonal braces 33. The pivot bolt 37 is shown supported in spaced plates 38 similar to the plates 35 supporting the pivot bolts 34.

The front end of the sleeve extends slightly beyond the front cross member 7 of the trailer frame, as best illustrated in Figure 4, and is adapted to be received between spaced guide members 39 secured to and depending from the front cross member 7 of the trailer frame as best illustrated in Figure 8. The guide members 39 prevent relative lateral movement of the trailer frame with respect to the front end of the sleeve 32.

The tow bar 31 is relatively slidable within the sleeve 32 and is provided at its forward end with coupling elements 41 for coupling the trailer to a towing vehicle, such as an automobile, truck, or tractor. Secured to the rear end of the tow bar 31 are spaced lugs 42, shown fitted into the rear end of the tow bar and welded to the side walls thereof in spaced relation, as clearly illustrated in Figure 9. The sleeve 32 and tow bar 31 are preferably square in cross section, as illustrated in the drawings.

Pivotally mounted on a pivot pin 40, supported in suitable brackets 43 secured to the rearwardly extending arms 36, is a cam lever, generally designated by the numeral 44. This cam lever is shown constructed of strap metal and has a semi-cylindrical portion 45 terminating at its upper end with a forwardly and downwardly extending straight portion 46, the lower end of which has secured thereto a strap element 47 which cooperates with the portion 46 of the cam lever to provide an elongated opening or slot 48 adapted to receive a pin or bolt 49 mounted in the lower ends of the brackets 42, as clearly illustrated in Figures 4 and 9.

The lower portion 51 of the cam lever 44 extends forwardly and is secured to the lower end of the portion 46 of the cam lever, thereby to provide in effect an integral structure. A cross member 52 has its ends fixedly secured to the ends 46 and 51 at the junctures between said members and the semi-cylindrical portion 45 of the cam lever, to thereby adequately strengthen the cam lever so that it will withstand the work assigned thereto.

Interposed between and secured to the diagonal braces 26 of the trailer frame 4 is a cross member 53, preferably of angle iron cross section, as best shown in Figure 4. The cross member 53 is secured to the upper horizontal flanges of the diagonal braces 26 and to the vertical flanges of the braces 26, by such means as welding or riveting.

Plates or lugs 54 are shown welded to the cross member 53 and are spaced apart to receive and guide the cylindrical portion 45 of the cam lever 44, as will be understood by reference to Figure 4. A suitable roller 55 is shown rotatably supported upon a pin 56 supported in the spaced lugs 54, and a pin 57 is supported in the lugs 54 below the semi-cylindrical portion of the cam lever, as shown in Figure 4. In other words, when the cam lever is in its normal position, shown in Figure 4, the roller 55 will be positioned above the semi-cylindrical portion 45 of the cam lever and the pin 57 beneath said portion.

Secured to the upper face of the sleeve 32 is a suitable keeper 58 comprising a slidably mounted latch or bolt 59 adapted to engage the lower flange of the front member 7 of the trailer frame 4, whereby to lock the trailer frame in its normal horizontal load-receiving position, shown in Figures 1 and 4. An operating member 62 is shown mounted on the sleeve 32 and has an arm 63 operatively connected to the latch member 59 by a flexible connecting element 64. The operating member 62 is also shown having a depending arm 65 to which one end of an operating cable, not shown, may be connected whereby an operator seated on a tractor to which the trailer is coupled may manipulate the latch 59 when it is desired to dump the trailer, as shown in Figure 3.

The novel load dumping trailer herein disclosed is operated to dump its load by relative rearward longitudinal movement of the tow bar 31 within the sleeve 32, as hereinbefore stated. To accomplish this action it is essential that the trailer wheels be locked against rearward movement. This may be accomplished by placing a suitable block 66 back of the trailer wheels as indicated in Figure 3, to thereby prevent rearward rolling movement of the trailer wheels when the towing vehicle is relatively moved in a direction towards the trailer wheels.

Before reversing the movement of the towing vehicle, the latch 59 is actuated to release the trailer frame from the tongue, whereupon relative rearward movement of the tow bar 31 within the sleeve 32 will cause the cam lever to swing from the position shown in Figure 4 to the position shown in Figure 3, as a result of the pin 49 carried by the rear end of the tow bar engaging in the opening or slot 48 of the lower front end of the cam lever.

The construction of the cam lever is important, because it provides a powerful cam action to initially start the load in its load-dumping movement. In other words, when the trailer body is in its normal horizontal position, the roller 55 carried by the trailer frame is positioned relatively close to the pivot pin 40, and the engagement of the pin 49 of the tow bar 31 with the lower front end of the cam lever 44, is spaced a considerable distance from the pivot pin 40, whereby a powerful lever action is obtained for initially starting the trailer frame in its load dumping movement.

As the towing vehicle continues in its reverse movement relative to the trailer wheels, the tow bar continues to slide rearwardly in the sleeve 32 with the result that the cam lever 44 is eventually swung to the position shown in Figure 3, whereby the trailer frame is tilted to its maximum load dumping position. Suitable means, not shown, is provided for preventing tilting movement of the trailer frame beyond the inclined position shown in Figure 3.

In the operation of dumping a load, it will be noted that the trailer body pivots about the axis of the axle 2. To return the trailer body to its normal horizontal load receiving position, the block 66 is removed from the position shown at the rear of the trailer wheel to the dotted line position shown in front of the trailer wheel, whereupon when the towing vehicle is moved forwardly the tow bar will relatively move within the sleeve 32 in a forward direction because of the trailer wheels being locked against forward movement.

Such relative movement of the tow bar within the sleeve 32 will cause the cam lever 44 to return to its normal position, shown in Figure 4, thereby returning the trailer frame 4 to its horizontal position by the combined forces of the forward pulling action of the tongue on the spring housings 9 of the trailer axle, and as a result of the cam lever 44 engaging the rod or bolt 57 and thereby exerting a downward cam action on the trailer frame, as the cam lever swings from the position shown in Figure 3 to that shown in Figure 4. The guide members 39 at the forward end of the trailer body or frame will accurately guide the frame into its horizontal position shown in Figures 1 and 4, whereupon the latch 59 automatically lockingly engages the front frame member 7 of the trailer frame to thereby secure the trailer body in its normal load carrying position.

In the application drawings, blocks 66 are shown utilized for preventing forward or rearward rolling movement of the trailer wheels in the operation of dumping the trailer body or returning it to its normal horizontal position. It is to be understood, however, that other means may be provided for temporarily locking the trailer wheels against rolling movement as, for example, they may be equipped with suitable brakes operable from the driver's seat on the towing vehicle, whereby a single operator may readily control the dumping action of the trailer.

The novel dumping trailer herein disclosed has been found extremely practical and efficient in actual operation. The tilting action of the trailer frame or body is controlled entirely by relative movement of the tow bar with respect to the sleeve 32, which is actuated by relative rearward or forward movement of the towing vehicle.

The entire apparatus is also extremely simple and inexpensive in construction whereby it readily lends itself for manufacture in quantity production at low cost.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence, it will be appreciated that the herein disclosed embodiments are illustrative only, and that my invention is not limited thereto.

I claim as my invention:

1. In a trailer of the class described, carrying wheels, a load carrying frame mounted for tilting movement on said wheels, a tongue having its rear end operatively connected to the trailer frame and having means at its forward end for coupling it to a towing vehicle, said tongue comprising telescoping members mounted for relative longitudinal movement, and means made operable by relative longitudinal movement of one of said tongue members with respect to the other tongue member, when the trailer wheels are locked against rolling movement, to tilt the trailer frame from load carrying to load dumping position, said means being rendered operable to return the trailer frame to load carrying position when said tongue members are elongated.

2. In a trailer of the class described, carrying wheels, a load carrying frame mounted for tilting movement on said wheels, a tongue comprising telescoping members, one of said tongue members being operatively connected to the trailer frame, and a cam lever pivoted on one of the tongue members and having operative connections with the other of said tongue members and with the trailer frame and adapted upon relative longitudinal movement of said members in one direction, when the trailer wheels are in locked position, to tilt the trailer frame to load dumping position.

3. In a trailer of the class described, an axle provided with suitable carrying wheels, a load carrying frame mounted for tilting movement on said axle, a tongue comprising telescoping members, one of which has its rear end pivotally connected to the trailer frame, and a cam element pivotally mounted on one of said tongue members and having an operative connection with the trailer frame and adapted upon relative longitudinal movement of said tongue members, when the trailer wheels are locked against movement in a rearward direction, to tilt the trailer frame to a load dumping position, and adapted upon elongation of the tongue members to return the trailer frame to its horizontal load receiving position.

4. In a trailer of the class described, an axle provided with suitable carrying wheels, a load carrying frame mounted for tilting movement about the axis of said axle, a tongue comprising a sleeve having its rear end pivotally connected to the trailer frame above the axle, a cam element pivotally supported on the sleeve, means operatively connecting the cam element to the trailer frame, a tow bar slidably mounted in said sleeve and having one end pivotally connected to the cam element, said cam element being adapted upon rearward movement of the tow bar within said sleeve, when the trailer wheels are locked against rearward rolling movement, to tilt the trailer frame to a load dumping position, and said cam element being adapted to return the trailer frame to its horizontal load receiving position when the tow bar is moved forwardly within the sleeve and the trailer wheels are locked against forward rolling movement.

5. In a trailer of the class described, an axle provided with suitable carrying wheels, a load carrying frame mounted for tilting movement about the axis of said axle, a tongue comprising a sleeve provided at its rear end with outwardly extending arms having their rear ends pivoted to the trailer frame adjacent to the side rails thereof, a cam element pivotally supported on the sleeve, means operatively connecting the cam element to the trailer frame, a tow bar slidably mounted in said sleeve and having its rear end pivotally and slidably connected to the cam element, said cam element being adapted upon relative rearward movement of the tow bar within said sleeve, when the trailer wheels are locked against rearward rolling movement, to tilt the trailer frame to a load dumping position, and said cam element being adapted to return the trailer frame to its horizontal load receiving position when the tow bar is moved forwardly within the sleeve and the trailer wheels are locked against forward rolling movement.

6. In a trailer of the class described, an axle provided with suitable carrying wheels, a load carrying frame mounted for pivotal movement on the axle, a sleeve having rearwardly extending arms operatively connected to the trailer frame and having means at its forward end for locking the trailer frame in horizontal load receiving position, a tow bar mounted for relative sliding movement within said sleeve and having means at its forward end for coupling it to a propelling vehicle such as a tractor, a cam lever pivotally carried by the sleeve member and having operative connections with the trailer frame and the rear end of the tow bar, and said cam lever being made operable by relative longitudinal movement of the tow bar in said sleeve to tilt the trailer frame to a load dumping position, or to return it to a horizontal load receiving position, when the trailer carrying wheels are locked against rolling movement.

7. In a trailer of the class described, a load carrying frame provided with suitable carrying wheels upon which said frame is tiltable, a tongue comprisng a sleeve having means operatively connecting the rear end thereof to the trailer frame adjacent to said wheels, a tow bar mounted for limited longitudinal movement within said sleeve, a cam lever pivotally supported on the sleeve and having a semi-circular portion movably and inseparably connected to the trailer frame, said cam lever having a depending lever portion pivotally and slidably connected to the rear end of the tow bar whereby relative longitudinal movement of the tow bar in said sleeve will impart pivotal movement to the cam lever and thereby tilt the trailer frame to a load dumping or load receiving position, depending upon the direction of movement of the tow bar within said sleeve, and means for locking the trailer wheels against rolling movement to effect actuation of the tow bar in said sleeve.

8. In a trailer of the class described, a load carrying frame provided with suitable carrying wheels upon which said frame is tiltable, a tongue comprising a sleeve having means operatively connecting the rear end thereof to the trailer frame adjacent to said wheels, a tow bar mounted for limited longitudinal movement within said sleeve, a cam lever pivotally supported on the sleeve and having an enlarged semi-circular strap-like portion movably and inseperably connected to the trailer frame, said cam lever also having a depending lever portion having means for pivotally and slidably connecting it to the rear end of the tow bar whereby relative longitudinal movement of the tow bar in said sleeve will impart pivotal movement to the cam lever and thereby tilt the trailer frame to a load dumping or load receiving position, depending upon the direction of movement of the tow bar within said sleeve, and means for locking the trailer wheels against rolling movement to effect actuation of the tow bar in said sleeve.

9. In a trailer of the class described, an axle provided with carrying wheels, a load carrying frame having suitable housings secured to and depending from the side rack thereof, spring elements in said housings, elongated openings in the opposed side walls of each housing at the lower ends thereof adapted to receive the axle, means for retaining the axle in said housings, a sleeve having rearwardly extending arms pivotally connected to the trailer frame, a tow bar mounted for relative axial movement in the sleeve and having means at its forward end for coupling it to a towing vehicle, a cam lever pivotally mounted on the rearwardly extending arms of the sleeve and having an operative connection with the trailer frame, and means whereby relative longitudinal movement of the tow bar in said sleeve, when the trailer wheels are locked against rolling movement, will impart pivotal movement to the cam lever and thereby cause said lever to tilt the trailer frame to a load dumping position or a load receiving position, depending upon the direction of movement of the tow bar in the sleeve.

JOSEPH E. ECKLUND.

REFERENCES CITED

The following references are of record in the file of this patent:

UNITED STATES PATENTS

| Number | Name | Date |
|---|---|---|
| 1,678,395 | Kellems | July 24, 1928 |
| 1,824,234 | Rhodes et al. | Sept. 22, 1931 |
| 1,958,623 | Herman | May 15, 1934 |
| 2,336,452 | Anderson | Dec. 14, 1943 |
| 2,436,443 | Meisenhelder | Feb. 24, 1948 |